(12) United States Patent
Keefer et al.

(10) Patent No.: US 8,261,517 B2
(45) Date of Patent: Sep. 11, 2012

(54) FUEL CAP

(76) Inventors: Neal L. Keefer, Portland, OR (US);
Evan Waymire, West Linn, OR (US);
Kenneth A. Watson, Vancouver, WA (US)

( * ) Notice: Subject to any disclaimer, the term of this patent is extended or adjusted under 35 U.S.C. 154(b) by 643 days.

(21) Appl. No.: 12/378,519

(22) Filed: Feb. 17, 2009

(65) Prior Publication Data

US 2009/0223970 A1 Sep. 10, 2009

Related U.S. Application Data

(60) Provisional application No. 61/066,446, filed on Feb. 19, 2008.

(51) Int. Cl.
*B65B 7/28* (2006.01)
(52) U.S. Cl. ............................................. 53/490; 137/72
(58) Field of Classification Search .................... 53/490, 53/331.5, 317; 137/72, 74, 43
See application file for complete search history.

(56) References Cited

U.S. PATENT DOCUMENTS

| | | | | |
|---|---|---|---|---|
| 4,325,398 A * | 4/1982 | Green | | 137/39 |
| 4,487,215 A * | 12/1984 | Green | | 137/43 |
| 4,811,857 A * | 3/1989 | Thompson | | 215/329 |
| 5,111,837 A * | 5/1992 | Morris et al. | | 137/72 |
| 5,325,882 A * | 7/1994 | Forsythe et al. | | 137/73 |
| 5,405,040 A * | 4/1995 | Keller | | 220/304 |
| 5,762,091 A * | 6/1998 | Sarne et al. | | 137/74 |
| 5,810,366 A * | 9/1998 | Montjoy et al. | | 279/43 |
| 6,145,530 A * | 11/2000 | Fernandez | | 137/74 |
| 6,619,497 B2 * | 9/2003 | Freiler | | 220/201 |
| 7,017,599 B2 * | 3/2006 | Keefer et al. | | 137/72 |
| 7,490,454 B2 * | 2/2009 | Brown | | 53/490 |

* cited by examiner

*Primary Examiner* — Sameh H. Tawfik
(74) *Attorney, Agent, or Firm* — Ingrid McTaggart

(57) ABSTRACT

A fuel tank cap including a body, a seal carrier movably positioned within the body, a first seal positioned on the seal carrier and configured for sealably engaging a filler tube opening of a fuel tank, and a second seal positioned on the seal carrier and configured for sealably engaging the body.

7 Claims, 4 Drawing Sheets

FUEL CAP

This application claims priority on U.S. provisional patent application filed Feb. 19, 2008, and assigned application number 61/066,446, in the name of the same inventors.

BACKGROUND OF THE INVENTION

Fuel tank caps, also called filler cap assemblies, may be used for sealing the opening of a fuel tank of a vehicle, such as a commercial vehicle. Fuel caps typically are placed on the fuel tank opening and are locked in place to create an airtight seal over the opening. It may be desirable that the airtight seal be maintained during operation of the vehicle so that fuel is not lost to the atmosphere and so that spillage of the fuel does not occur. Accordingly, it may be desirable that the seal and the locking mechanism be sturdy enough to withstand the harsh environmental conditions of commercial vehicle usage such as extreme weather conditions and continued vibration of the fuel tank and cap during operation of the vehicle. Moreover, it may be desirable that fuel caps maintain an airtight seal over the fuel tank opening during a sudden impact to the fuel tank, such as during a collision, so that fuel is not discharged which may result in a fire or an explosion.

SUMMARY OF THE INVENTION

The present invention provides a fuel cap including a body having a movable seal carrier. Two seals are positioned on the seal carrier. The first seal defines an air tight and fluid tight seal between the fuel cap and the seal carrier and the second seal defines an air tight and fluid tight seal between the seal carrier and a fuel filler neck assembly. The seal carrier is movably biased by a spring positioned within the fuel cap.

DETAILED DESCRIPTION OF THE DRAWINGS

Figure 1:
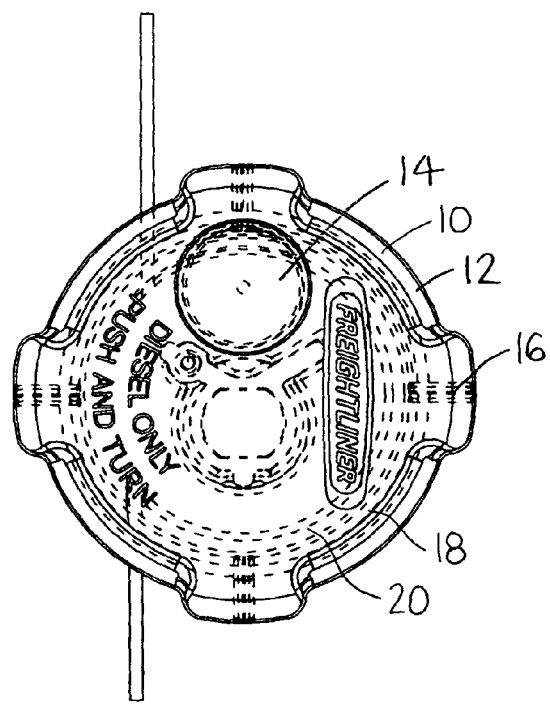
FIG. 1 is a top view showing internal components of one embodiment of the fuel cap in an uninstalled condition wherein the seal carrier includes two O-ring seals.
Figure 3:
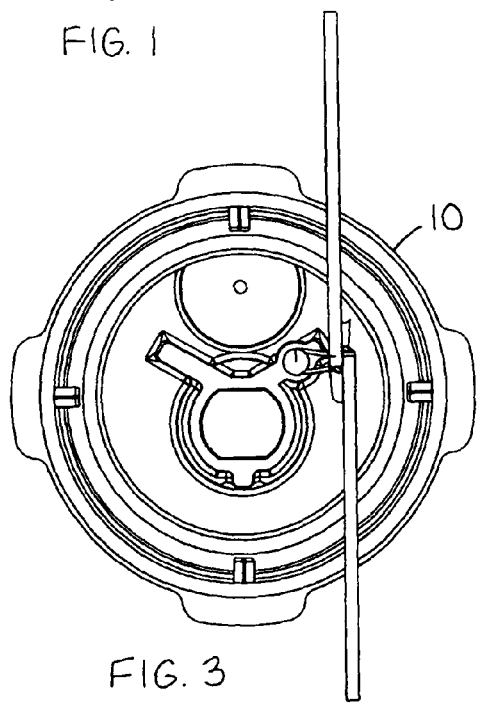
FIG. 3 is a bottom view of one embodiment of the fuel cap of FIG. 1.

FIG. 1 is a top view showing internal components of one embodiment of the fuel cap in an uninstalled condition wherein the seal carrier includes two O-ring seals. Fuel cap 10 includes a cap body 12 including an internal cavity or recess 14. Split pins 16 are positioned within cap body 12 and extend into cavity 14. Split pins 16 retain a seal carrier 18 within cavity 14 and may also be used to engage cap surface on a fuel filler assembly to secure the cap on the fuel filler assembly. Seal carrier element 18 may be manufactured of plastic for ease of manufacturing and so as to reduce manufacturing costs. A biasing element 20, such as a spring, may bias seal carrier 18 against split pins 16 such that biasing element 20 biases movable seal carrier 18 along an axis 12a in a direction 12b. In other words, biasing element 20 biases seal carrier 18 in direction 12b and into contact with pins 16 in the absence of an external force, and wherein an external force may overcome the biasing force of spring 20 and force seal carrier 18 in a direction opposite direction 12b, such as during installation of cap 12 on fuel filler neck 28 of assembly 30. Biasing element 20 may be conical in shape so that when compressed the spring may seat completely within itself. This allows for a compact design of fuel cap 10.

Figure 2A:
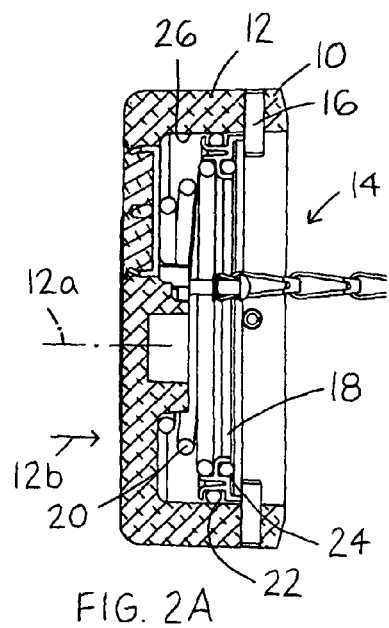
FIGS. 2A-2C is a side cross-sectional view of one embodiment of the fuel cap of FIG. 1, a detail of the cross-section of the seal carrier and seals, and a detail of the cross-section of the seal carrier and seals with the seal carrier's cantilevered arm in a biased position.
Figure 5:
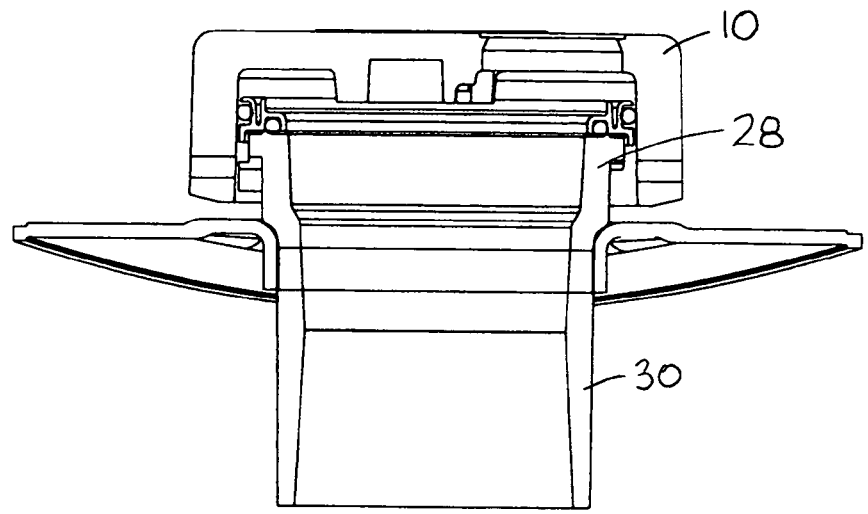
FIG. 5 is a side cross-sectional view of one embodiment of the cap of FIG. 1 installed on a fuel filler assembly.
Figure 6:
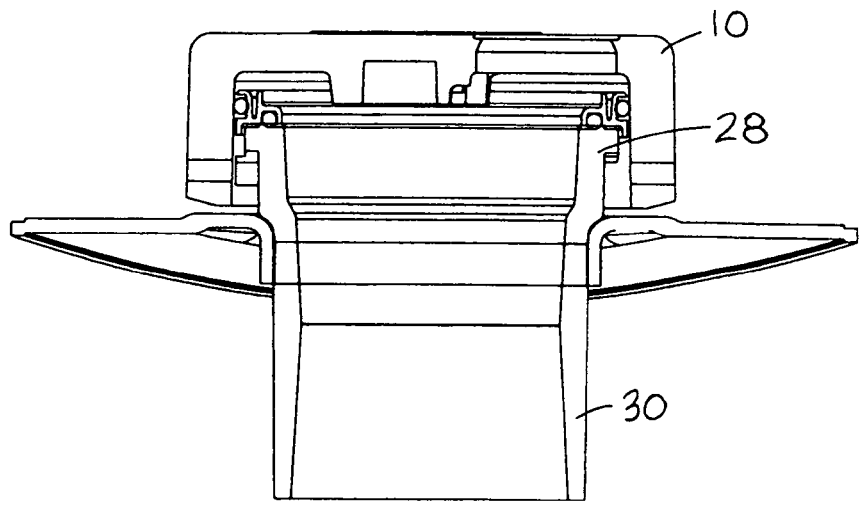
FIG. 6 is a side cross-sectional view of one embodiment of the cap of FIG. 1 in a removal position on a fuel filler assembly.
Figure 7:
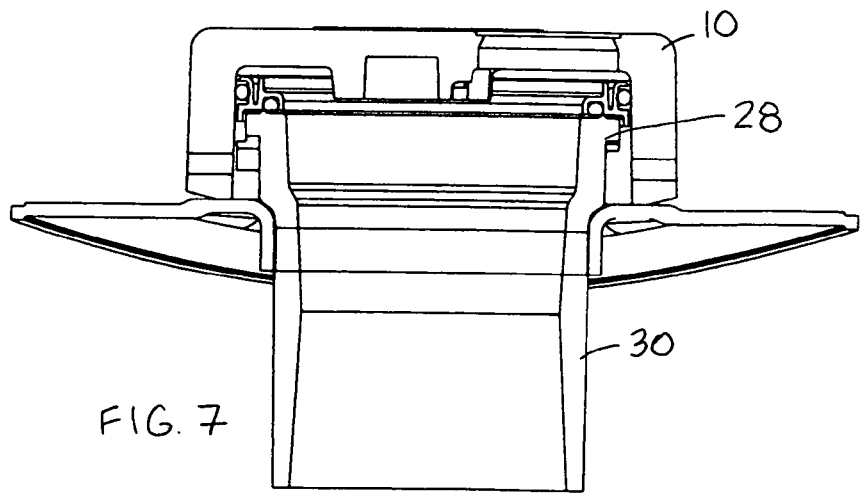
FIG. 7 is a side cross-sectional view of one embodiment of the cap of FIG. 1 bottomed on a fuel filler assembly pocket.

As shown in FIG. 2A, seal carrier 18 includes two seals thereon, a first seal 22 and a second seal 24. In the embodiment shown in FIGS. 1-7, first and second seals 22 and 24 are each O-ring seals. First O-ring seal 22 defines an airtight and fluid tight seal between seal carrier 18 and an internal wall 26 of cap body 12. Second O-ring seal 24 defines an airtight and fluid tight seal between seal carrier 18 and a neck 28 of a fuel filler assembly 30 (FIG. 5).

Figures 2B, 2C:
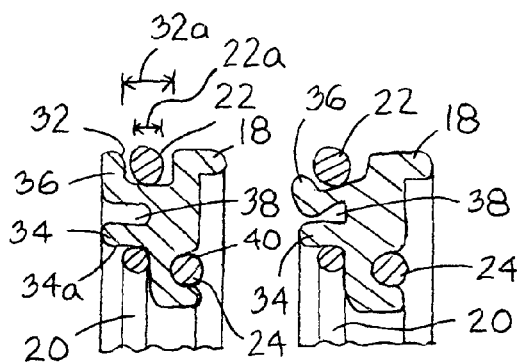
Figure 4:
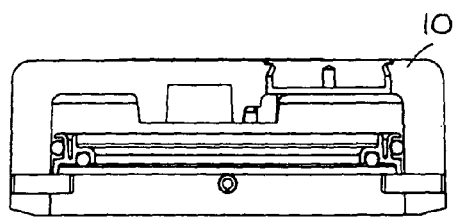
FIG. 4 is a side cross-sectional view of one embodiment of the cap of FIG. 1 in the uninstalled condition.

As shown in FIG. 2B, first seal 22 is seated within a groove 32 or recess of seal carrier 18 wherein groove 32 defines a width 32a greater than a diameter 22a of first seal 22. Accordingly, O-ring seal 22 can roll within groove 32 thereby reducing the break-away friction of the seal 22. In other words, as the cap 12 is pushed downwardly on the fuel filler assembly 30, seal 22 rolls along the internal wall 26 of cap body 12 so that seal 22 is not damaged by the wear and tear of rubbing along internal wall 26. As the cap 12 is secured in place, the cap may rise slightly on assembly 30 as pins 16 are received within indentations of cam surfaces (not shown) of assembly 30. During this slight rising of cap 12, seal 22 may roll along internal wall 26 of cap body 12, further reducing wear and tear of the seal during repeated installations of the cap 12 on assembly 30. Accordingly, groove 32, having a width 32a greater that a width 22a of first seal 22 reduces wear and tear on the seal, reduces the break-away friction of the seal 22, and allows the seal to conform to imperfections of the internal wall 26 of cap 12, thus increasing the probability of a good air-tight and fluid-tight seal.

As shown in FIG. 2C, in this figure seal 22 is biased by an external force such that a protrusion 36 that retains seal 22 in place on carrier 18 has moved radially inwardly toward a protrusion 34 that secures spring 20 on carrier 18, and into an air gap 38 between the protrusions 34 and 36. Such movement of seal 22 on protrusion 36 allows the seal to sealingly engage the internal wall 26 of cap 12, even in situations when internal wall 26 may have imperfections due to the casting method by which cap 12 may be manufactured.

Seal carrier 18 includes protrusion 34 that includes a stop surface 34a to retain biasing element 20 thereon. Protrusion 36 that defines groove 32 of first seal 22 is separated from stop surface 34a by air gap 38. Accordingly, protrusion 36 of groove 32 is somewhat flexible and biases first seal 22 against internal wall 26 (FIG. 2A) of cap body 12 (FIG. 2A) in a cantilevered fashion. In other words, protrusion 36 biases seal 22 radially outwardly from central axis 12a of cap 12 and the seal carrier 18 upon application of a radially inwardly directed force on seal 22, such as by the inwardly directed force on the seal 22 by internal walls 26 of cap 12. Accordingly, protrusion 36 is configured for movement into and out of air gap 38. The cantilevered biasing of first seal 22 on protrusion 36 allows first seal 22 to conform in shape to intolerances of internal wall 26, such as may be caused by slight differences in casted parts. The cantilevered biasing of first seal 22 against internal wall 26 of cap body 12 also allows for a relatively even pressure to be applied to seal 22 by seal carrier 18 around its perimeter.

Seal carrier 18 further includes a second groove 40 or recess that seats second seal 24 therein, the second seal 24 configured for sealing engagement with the neck 28 of fuel filler assembly 30 (FIG. 5).

FIGS. 3-7 show other views of the fuel cap 10 of FIG. 1.

Figure 8:
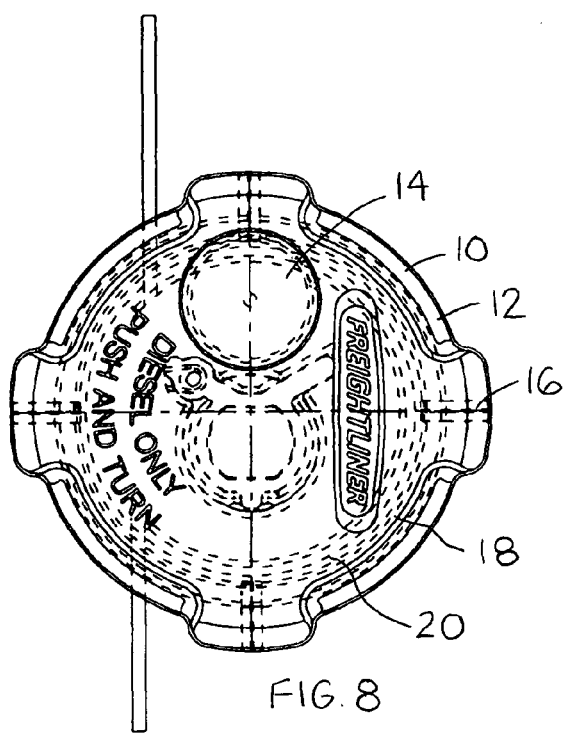
FIG. 8 is a top view showing internal components of another embodiment of the fuel cap in an uninstalled condition wherein the seal carrier includes one O-ring seal and one flat gasket seal.

FIG. 8 is a top view showing internal components of another embodiment of the fuel cap 10 in an uninstalled condition.

Figure 9A:
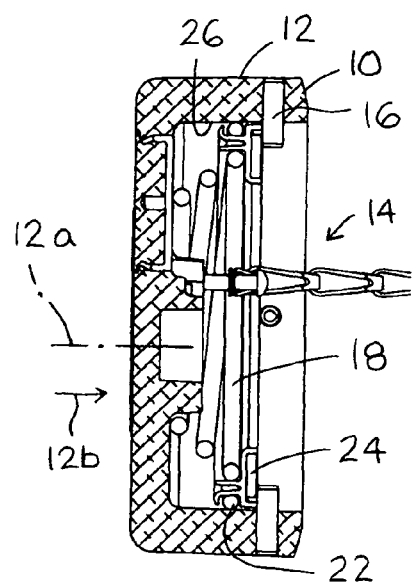
FIGS. 9A-9B is a side cross-sectional view of one embodiment of the fuel cap of FIG. 8, and detail of the cross-section on the seal carrier and seals.
Figure 9B:
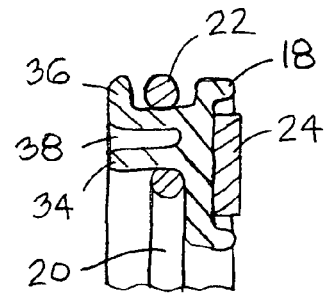
Figure 10:
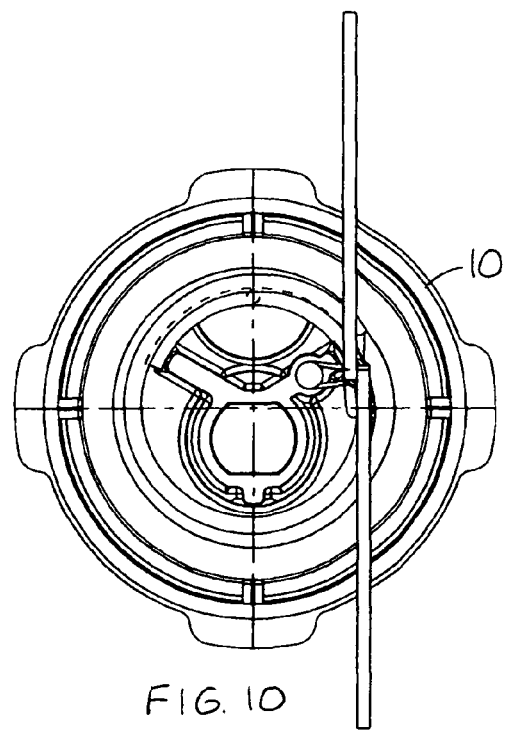
FIG. 10 is a bottom view of one embodiment of the fuel cap of FIG. 8.
Figure 11:
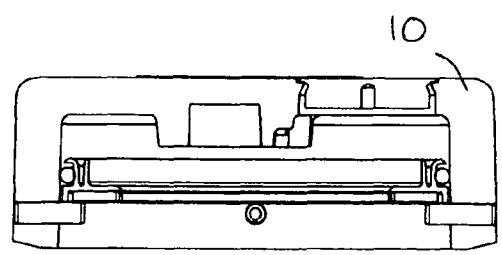
FIG. 11 is a side cross-sectional view of one embodiment of the cap of FIG. 8 in the uninstalled condition.
Figure 12:
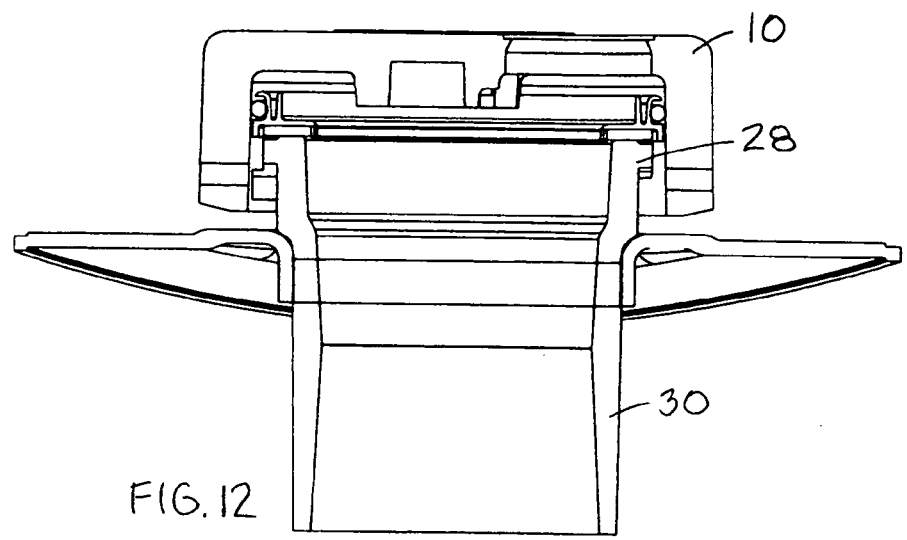
FIG. 12 is a side cross-sectional view of one embodiment of the cap of FIG. 8 installed on a fuel filler assembly.
Figure 13:
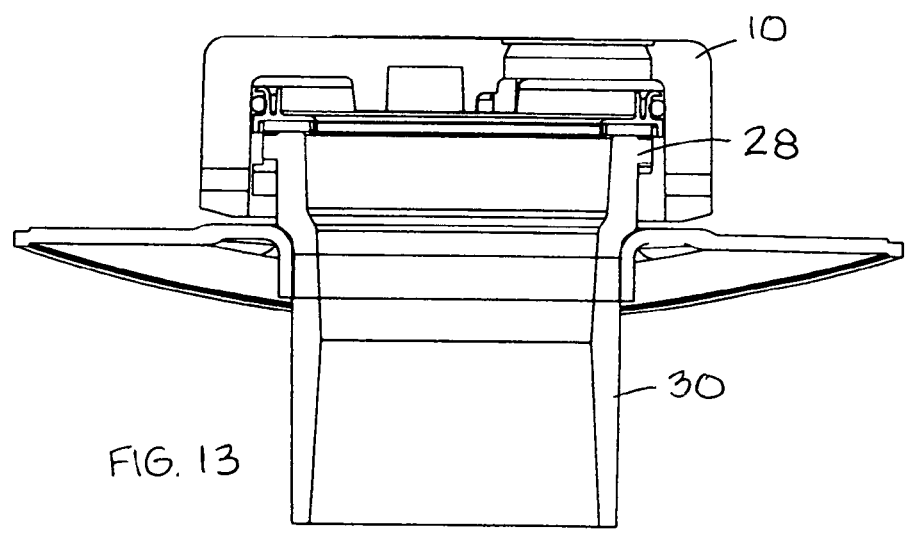
FIG. 13 is a side cross-sectional view of one embodiment of the cap of FIG. 8 in a removal position on a fuel filler assembly.
Figure 14:
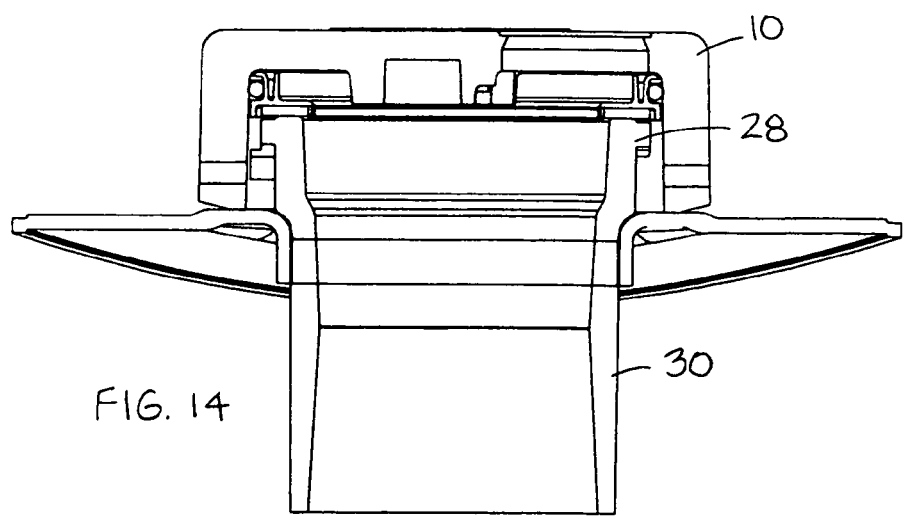
FIG. 14 is a side cross-sectional view of one embodiment of the cap of FIG. 8 bottomed on a fuel filler assembly pocket.

FIG. 9A is a side cross-sectional view of one embodiment of the fuel cap of FIG. 8 wherein the seal carrier includes one O-ring seal 22 and one flat gasket seal 24. A flat gasket seal 24 may provide for an increased surface area of seal contact with neck 28 of fuel filler assembly 30 (FIG. 12) when compared to an O-ring seal 24 (FIG. 2).

FIGS. 10-14 show other views of the fuel cap 10 of FIG. 8.

We claim:

1. A method of sealing a fuel tank, comprising:
   securing a fuel cap on a fuel tank filler neck;
   said fuel cap including a seal carrier including a first seal and a second seal positioned thereon,
   wherein said securing causes said seal carrier to move along an elongate axis of said cap, and wherein during said movement of said seal carrier, said first seal moves along and sealingly engages an inner surface of said fuel cap.

2. The method of claim 1 wherein said first seal comprises a seal having a circular cross-sectional shape, and wherein movement of said first seal along said inner surface of said fuel cap comprises rolling movement of said first seal.

3. The method of claim 1 wherein said seal carrier includes a base and an outwardly extending member that defines a seat for said first seal, and wherein said securing causes cantilevered movement of said outwardly extending member so as to movably bias said first seal into sealing engagement with said inner surface of said fuel cap.

4. The method of claim 3 wherein said seat of said seal carrier defines a seat surface positioned, in an unbiased condition, parallel to said elongate axis of said fuel cap, wherein said first seal moves along and simultaneously sealingly engages said inner surface of said fuel cap, and said first seal simultaneously moves along and simultaneously sealingly engages said seat surface of said seal carrier.

5. The method of claim 4 wherein movement of said first seal along said seat surface of said seal carrier comprises rolling movement of an outer circumferential surface of said first seal along said seat surface of said seal carrier.

6. The method of claim 1 wherein said securing causes said seal carrier to move along said elongate axis of said cap so as to compress a biasing element, wherein said biasing element biases said second seal into sealing engagement with said fuel tank filler neck.

7. The method of claim 1 wherein said securing includes twisting said cap on said filler neck along mating helical structures of said cap and said filler neck, and wherein said twisting of said cap causes said seal carrier to move linearly along said elongate axis of said cap.

* * * * *